(12) United States Patent
Campbell et al.

(10) Patent No.: US 8,424,964 B2
(45) Date of Patent: Apr. 23, 2013

(54) CHILD SAFETY SEAT

(75) Inventors: Corey A. Campbell, Wadsworth, OH (US); David E. Campbell, Westfield Center, OH (US); Troy Daniel Mason, Brownsburg, IN (US); Matthew Scott Graham, Noblesville, IN (US)

(73) Assignee: Clek Inc., Toronto (CA)

( * ) Notice: Subject to any disclaimer, the term of this patent is extended or adjusted under 35 U.S.C. 154(b) by 0 days.

(21) Appl. No.: 13/555,937

(22) Filed: Jul. 23, 2012

(65) Prior Publication Data

US 2013/0033076 A1 Feb. 7, 2013

Related U.S. Application Data

(63) Continuation of application No. 12/584,782, filed on Sep. 11, 2009, now Pat. No. 8,226,162.

(51) Int. Cl.
*B60N 2/26* (2006.01)
*A47D 1/10* (2006.01)

(52) U.S. Cl.
USPC ..................... 297/216.11; 297/253

(58) Field of Classification Search ............ 297/216.11, 297/253, 250.1, 256.13, 216.1
See application file for complete search history.

(56) References Cited

U.S. PATENT DOCUMENTS

| | | | | |
|---|---|---|---|---|
| 5,664,830 A | * | 9/1997 | Garcia et al. | 297/216.11 |
| 5,685,603 A | * | 11/1997 | Lane, Jr. | 297/216.11 |
| 6,454,350 B1 | * | 9/2002 | Celestina-Krevh et al. | 297/216.11 |
| 6,669,288 B2 | * | 12/2003 | Nakagawa et al. | 297/256.16 |
| 6,719,369 B1 | * | 4/2004 | Wagner | 297/250.1 |
| 7,699,393 B2 | * | 4/2010 | Forbes et al. | 297/216.11 |
| 2002/0060483 A1 | * | 5/2002 | Yoshida et al. | 297/250.1 |

* cited by examiner

*Primary Examiner* — Milton Nelson, Jr.

(57) ABSTRACT

A child safety seat includes a base, a seat body, a dampening member, and a non-planar impactor. The seat body is slidably secured to the base and is movable between a pre-collision position and a post-collision position. The dampening member is positioned between the base and the seat body. The non-planar impactor is secured to the seat body and is positioned to engage the dampening member. The non-planar impactor and the dampening member together provide a progressive dampening force against movement of the seat body from the pre-collision position to the post-collision position.

13 Claims, 20 Drawing Sheets

CHILD SAFETY SEAT

RELATED APPLICATIONS

This patent application is a continuation of U.S. patent application Ser. No. 12/584,732 (now U.S. Pat. No. 8,226,162), entitled Child Safety Seat, filed Sep. 11, 2009.

TECHNICAL FIELD

This patent application relates to child safety seats for use in automobiles. More particularly, this patent application relates to such a child safety seat having improved safety features, a conveniently releasable latch mechanism, and/or a conveniently adjustable head rest and shoulder harness arrangement.

BACKGROUND ART

Child safety seats for use in automobiles have been designed to include a variety of features. Many of these features relate to either improved safety of the seat or increased convenience and ease of use of the child safety seat. Specifically, one area of focus within the relevant market is the ability to adjust the restraint system of the safety seat for a growing child. Still, despite the significant efforts made in advancing child safety seat technology, many such seats remain difficult to install and adjust, and offer little advancement in the area of improved safety.

Many child safety seats offer the ability to adjust the height of shoulder belts of the harness system as a child grows taller. The most common method of allowing for adjustment of the shoulder belts is to provide a plurality of vertically spaced pairs of slots in the seat back. When desired, the shoulder belts are drawn back through the slots to the back of the safety seat and then inserted through a higher pair of slots. While this method of adjusting the shoulder belts is ultimately effective, it is also time consuming and awkward because it requires removing the safety seat from a vehicle, often meaning removing a child from the safety seat, adjusting the shoulder belts, and then reinstalling the safety seat in the vehicle. Other mechanisms have been developed in an attempt to make adjustment of the shoulder restraints simpler and less time consuming. However, these attempts still require access to the rear of the safety seat in order to permit adjustment of the shoulder restraint belts, thus still requiring removal of the seat from the vehicle.

Another design element of child safety seats that has been the focus of much attempted innovation is the mechanism by which the seat is secured within a vehicle. The conventional safety seat utilizes the vehicle's safety belt to secure it within the vehicle, often requiring the safety belt to be threaded through an opening in the seat. More recently, due in part to government regulations, the LATCH system as it is known in the United States also referred to as ISOFIX in Europe, LUAS or CANFIX in Canada, and UCSSS) has become more prominent. These systems include two lower anchor attachments and may include a top tether attachment, and are adapted to be attached to hooks provided in newer vehicles. The lower anchor attachments of the LATCH system may be provided in the form of a flexible belt with hook ends, or rigid attachments extending from the safety seat. In the case of a seat having rigid attachments, while installation of the seat is made more convenient, removal of the seat can be somewhat difficult due to the hard-to-reach location of the release mechanism for the rigid latch members.

One area that has received surprisingly little research and development within the safety seat industry is force dampening mechanisms, or energy absorbing systems, incorporated into the seats to reduce the forces felt by a child during an accident. Many advances have been made in the field of air-bags and other similar devices that reduce the forces felt by an adult in a car accident, but similar developments have not been seen in the field of child safety seats. One known mechanism for absorbing forces acting on a child safety seat during a crash, as disclosed in U.S. Pat. No. 5,664,830, involves providing a base and a seat body, the base and seat body being slidingly connected by a track system. The seat body is anchored and secured in place relative to the base by a shear pin, and a honey-comb core cylinder is positioned between the seat body and the base in the path of movement. When a load threshold has been surpassed during a collision, the shear pin is overcome and the seat body pivots on the track system relative to the base, thereby crushing the cylinder to absorb the forces of the crash. This system, however, does not take into account the varying size and weight of children occupying a child safety seat. A single resistance is provided by the energy absorbing cylinder, which often results in ineffective force dampening due to either insufficient energy absorption for a larger child or too much resistance for a smaller child.

SUMMARY

In general, a child safety seat includes a base, and a seat body slidably secured to the base and movable between a pre-collision position and a post-collision position. A dampening member is positioned between the base and the seat body, and a non-planar impactor is secured to the seat body and is positioned to engage the dampening member. The non-planar impactor and the dampening member provide a progressive dampening force against movement of the seat body from the pre-collision position to the post-collision position.

In accordance with one implementation, the child safety seat includes a support plate that is secured to the base, and an impactor that is secured to the seat body. A dampening member is positioned between the support plate and the impactor and includes a plurality of columns of varying lengths that provide a progressively increasing resistance to movement of the seat body from the pre-collision position to the post-collision position.

BRIEF DESCRIPTION OF THE DRAWINGS

A preferred exemplary child safety seat is shown by way of example in the accompanying drawings, in which.

DETAILED DESCRIPTION

Figure 1:
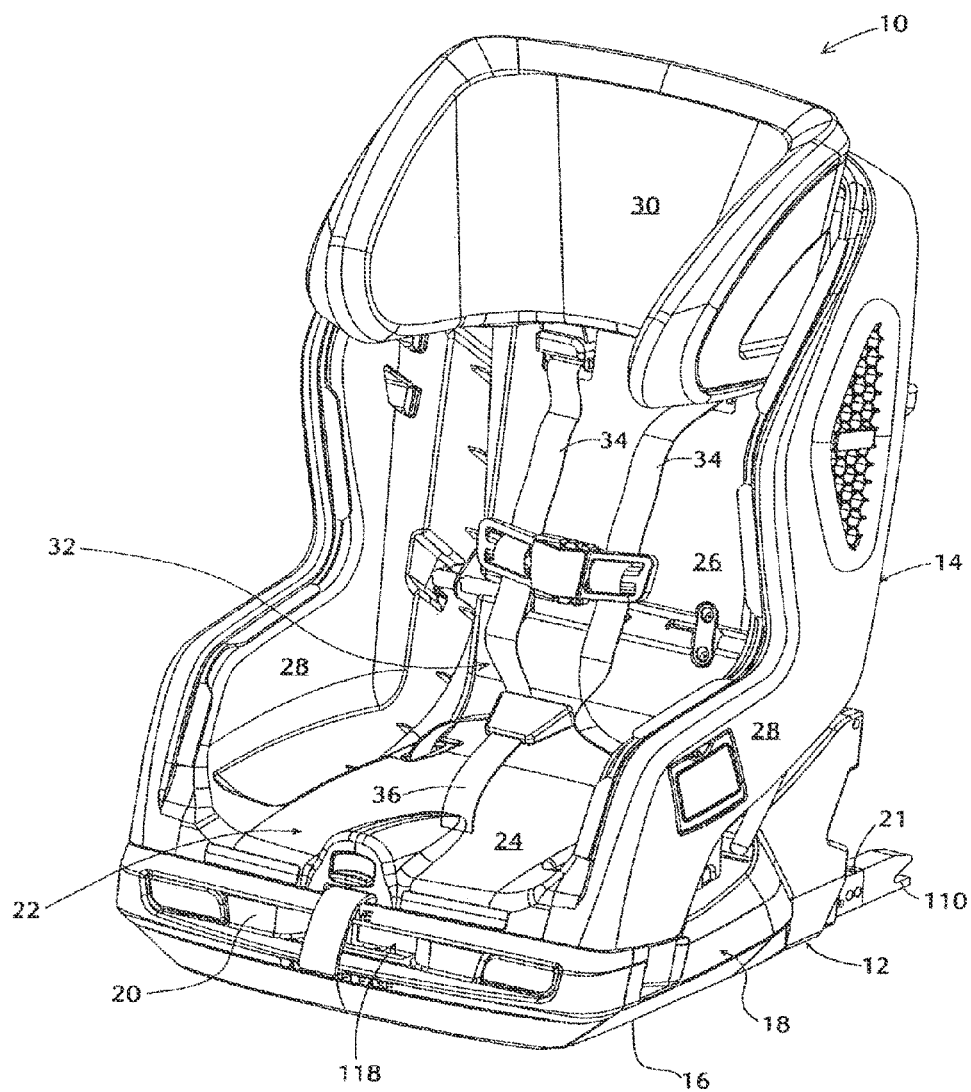
FIG. 1 is a perspective view of a child safety seat.
Figure 2:
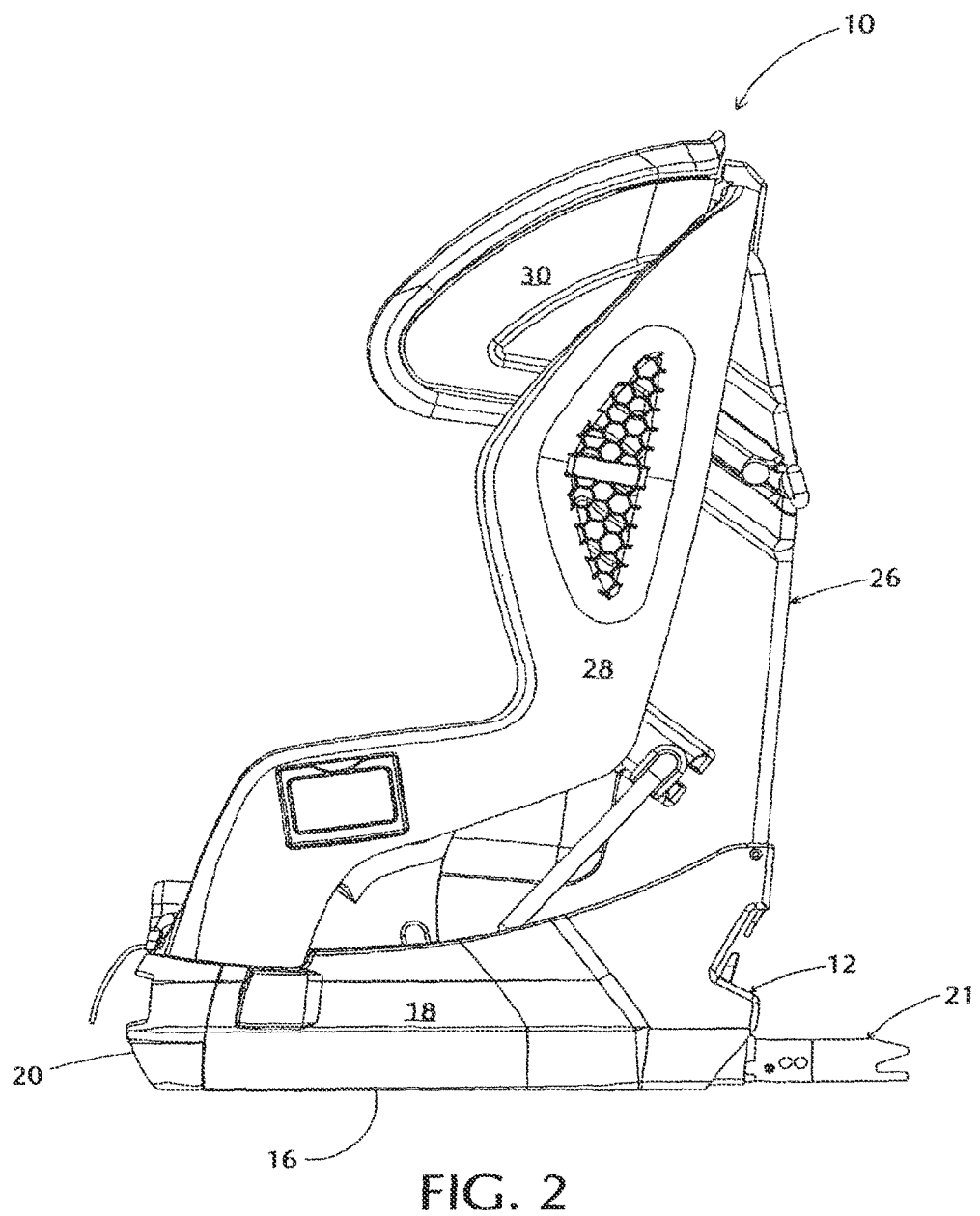
FIG. 2 is a side elevational view of the child safety seat of FIG. 1.
Figure 3:
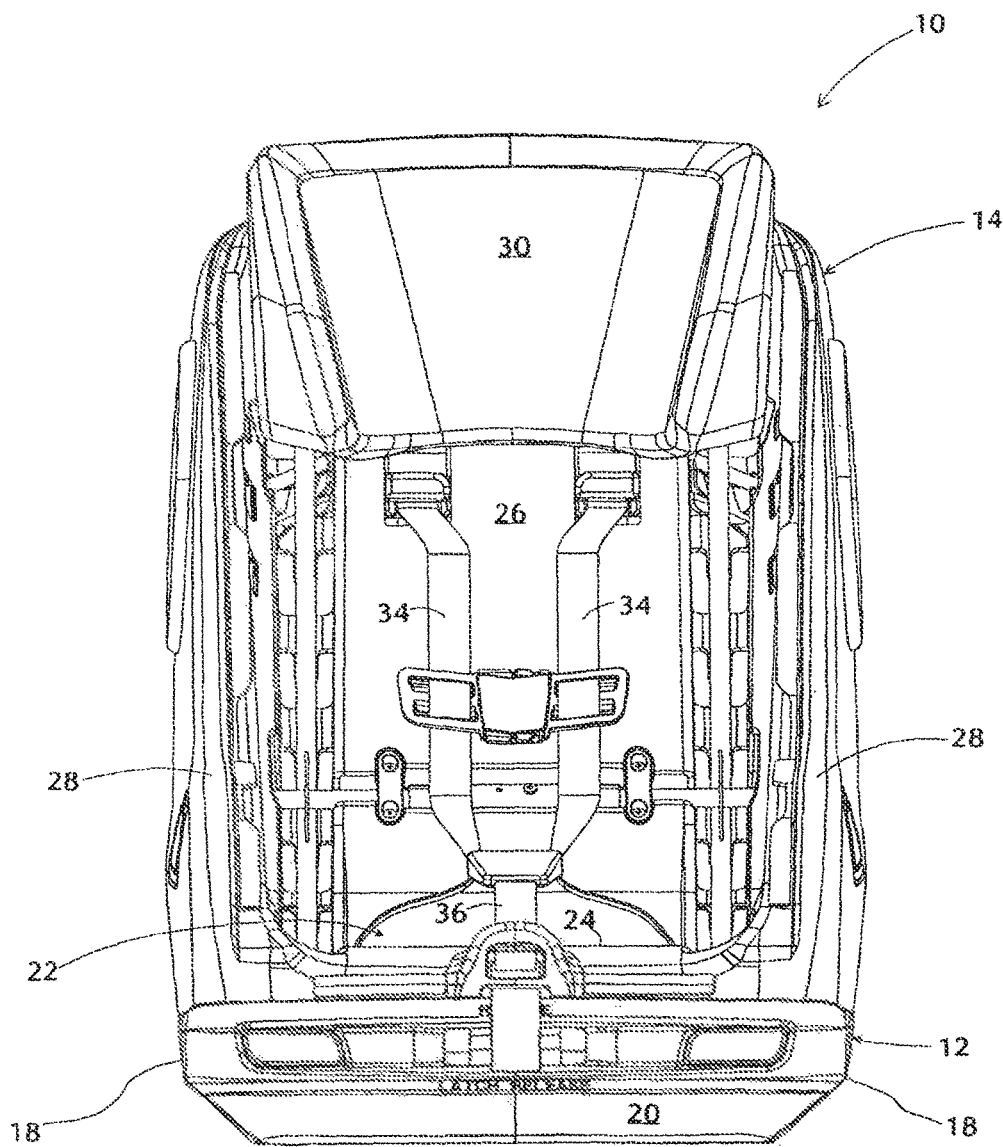
FIG. 3 is a front elevational view of the child safety seat of FIG. 1.
Figure 4:
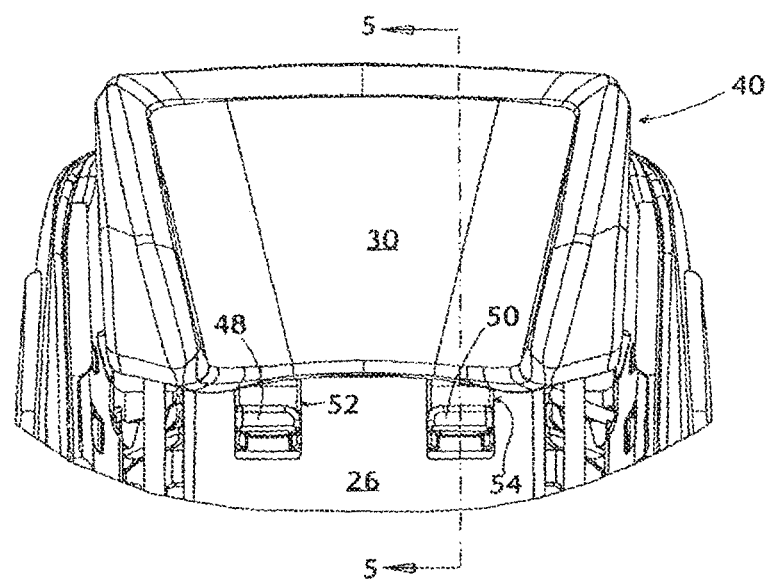
FIG. 4 is a front view of the headrest portion of the child safety seat of FIG. 3.
Figure 5:
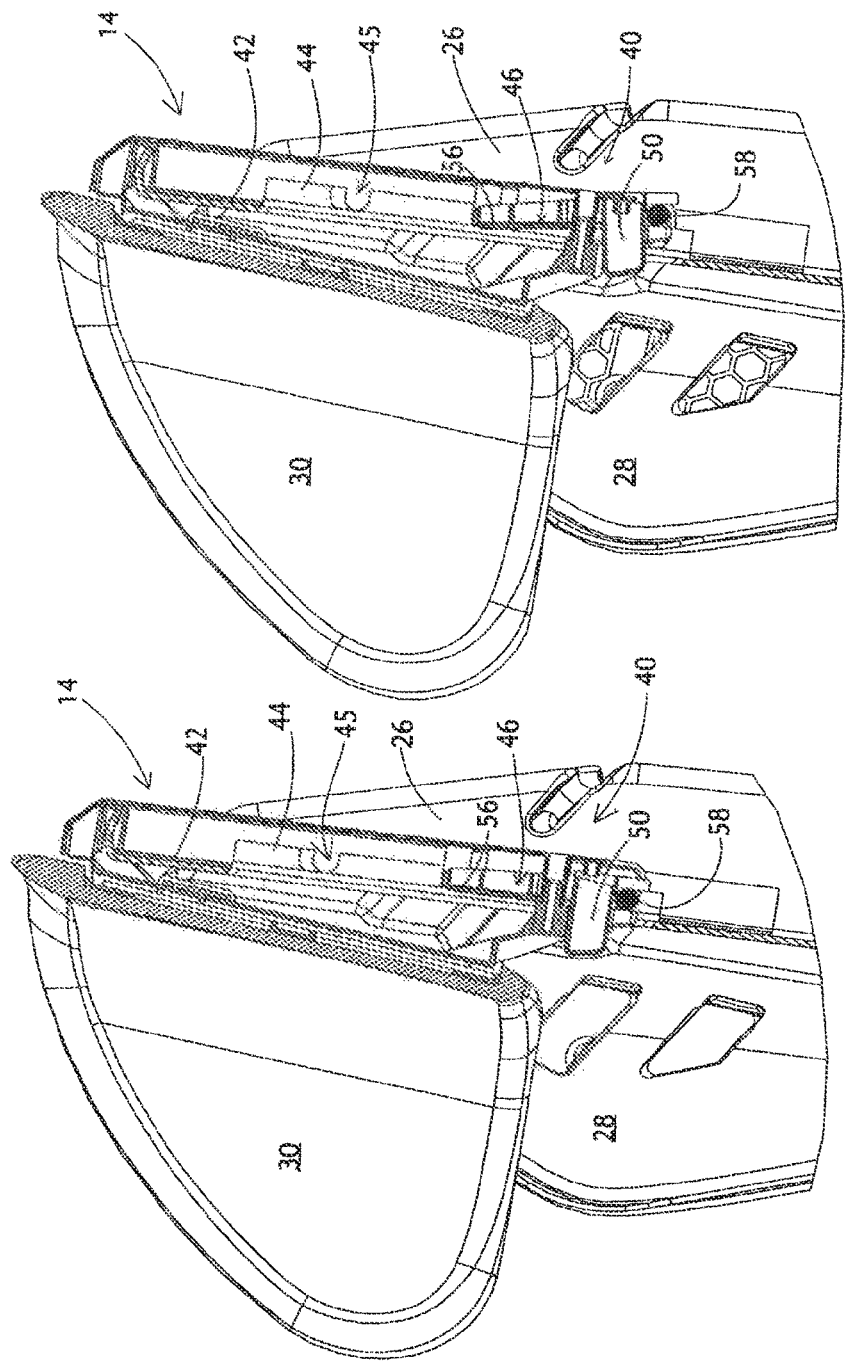
FIG. 5A is a section view taken generally along line 5-5 of FIG. 4 showing the headrest and shoulder belt adjustment mechanism in a locked position.
FIG. 5B is a section view similar to FIG. 5A showing the headrest and shoulder belt adjustment mechanism in a released position.

A child safety seat is indicated generally by the numeral 10. Child safety seat 10 includes a base 12 and a seat body 14 secured to the base. Base 12 includes a generally planar bottom 16 adapted to rest on the seat of a vehicle, opposing sidewalls 18, a front surface 20, and rigid latch members 21. Seat body 14 includes a seating surface 22 defined by a seat bottom 24 and a seat back 26, opposing seat sidewalls 28 and a headrest 30. Child safety seat 10 is adapted to be secured in a vehicle, and is configured to restrain a child therein. A harness system 32 is provided to safely secure the child within child safety seat 10, and includes shoulder belts 34 and lap belts 36. A vehicle belt securing system may also be provided to secure the child safety seat in a vehicle not equipped with LATCH hooks. The vehicle belt securing system may be any such system known to those skilled in the art. Molded plastic shell pieces are provided on the exterior of child safety seat 10 to improve the aesthetic appearance of the seat, and to hide and protect the working components of the seat. The outer shell may be modified or adapted without deviating from the scope of the invention. The novel aspects of the child safety seat will be described in greater detail below.

Headrest and Shoulder Strap Adjustment Assembly

Child safety seats, such as the one described herein, are preferably adjustable to accommodate children of varying sizes, and to adjust for the growth of each child. Therefore, the height of headrest 30 relative to seat bottom 24, and the height at which shoulder belts 34 extend from seat back 26, are selectively adjustable as a single unit, thereby increasing the ease and efficiency of adjustment. The headrest 30 and the headrest and shoulder belt adjustment mechanism is referred to hereinafter as a headrest assembly, and is indicated generally by the numeral 40.

Headrest assembly 40 is shown in detail in FIGS. 3-6. Headrest 30 is secured to a backplate 42 that is secured to and slidable relative to the seat back 26 of seat body 14. Laterally spaced vertical tracks 44 are provided within and secured to seat back 26 adjacent to the lateral edges of backplate 42. Vertical tracks 44 include notches 45 therein, the notches being spaced vertically along the track to define a plurality of height adjustment positions for headrest assembly 40. A release member 46 is pivotally secured to backplate 42 and is adapted to pivot from a locked position (FIG. 5A) to an adjustment position (FIG. 5B) to allow for vertical movement of headrest assembly 40.

Release member 46 includes laterally spaced release buttons 48 and 50 extending through laterally spaced, vertically oriented slots 52 and 54, respectively, in seat back 26. Release buttons 48, 50 are connected by a body portion 56 of release member 46 so that they pivot in unison. Thus, pressing either of the release buttons 48, 50 will result in the pivoting of release member 46 to an adjustment position. A locking rod 58 is carried by release member 46 and is positioned generally horizontally, extending between and laterally beyond release buttons 48 and 50. Locking rod 58 may be secured to release member 46 in any manner known to those skilled in the art. In one embodiment, locking rod 58 is a metal rod.

When release member 46 is in a locked position, as shown in FIG. 5A, locking rod 58 is received in one of notches 45 in each track 44, thereby securing headrest assembly 40 in place. Release member 46 is biased in a forward direction to remain in notches 45 one or more springs (not shown). When headrest assembly 40 is to be moved vertically, either up or down, one of release buttons 48, 50 is depressed toward backplate 42, thereby overcoming the biasing force, and moving locking rod 58 out of engagement with notches 45. Release member 46 is then in an adjustment position, as shown in FIG. 5B, and headrest assembly is free to move vertically along tracks 44 relative to seat back 26. As will be appreciated by those skilled in the art, when pressure is removed from a release button 48 or 50, the biasing force will return release member 46 to a locked position. Locking rod 58 will therefore be forced into the next notch 45 that it is aligned with, and headrest assembly will again be secured against vertical movement relative to seat back 26.

Figure 6:
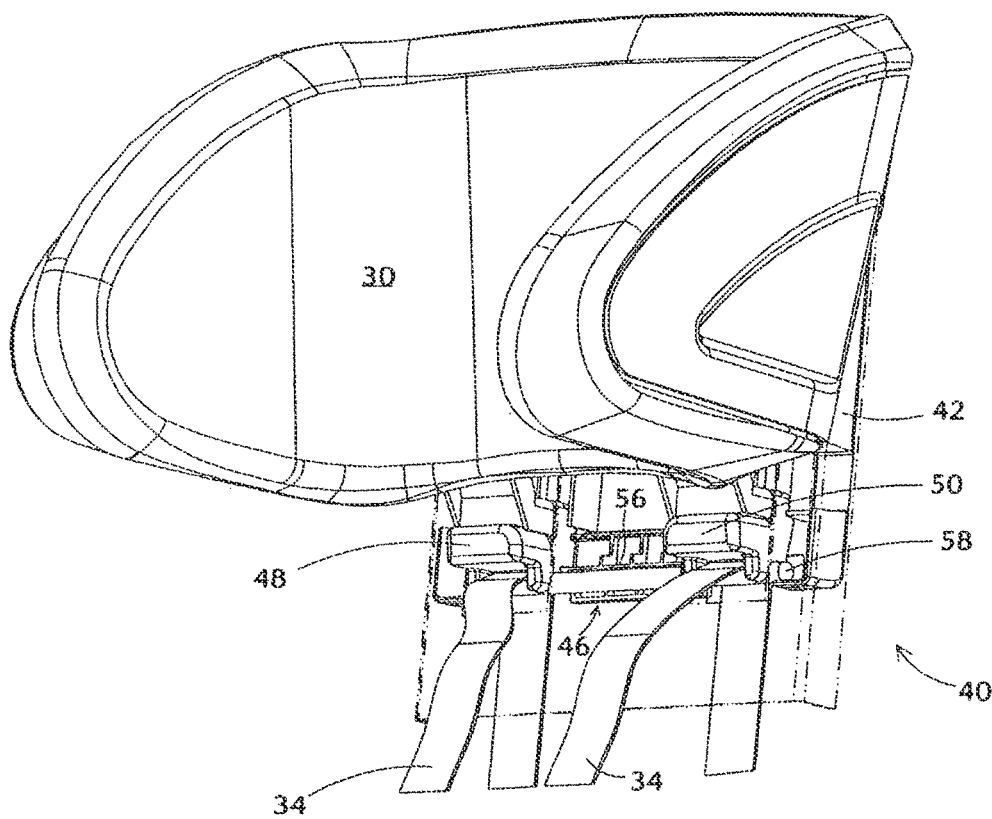
FIG. 6 is a perspective view of the headrest and shoulder belt portion of the child safety seat.

Locking rod 58 also acts as support for shoulder belts 34 of harness system 32 (FIG. 6). Shoulder belts 34 are routed within seat back 26 and extend outwardly from slots 52 and 54 in seat back 26 immediately beneath release buttons 48 and 50. Shoulder belts 34 are routed behind and over locking rod 58 before exiting through slots 52 and 54. Release member 46 is sized and shaped so as to allow shoulder belts 34 to be routed over locking rod 58, such as by providing recesses adjacent to locking rod 58. Sufficient clearance is provided for shoulder belts 34 so that the length of the shoulder belts and the height of headrest assembly 40 may be both be adjusted without being impeded by significant frictional forces. Thus, the height at which shoulder belts 34 extend through slots 52 and 54 is controlled by the position of locking rod 58 as a result of routing shoulder belts 34 over locking rod 58. As headrest assembly 40, and consequently locking rod 58, is moved vertically upward, the height at which the shoulder belts 34 are positioned is adjusted vertically by an equal distance.

The adjustment mechanism of headrest assembly 40 and shoulder belts 34 makes adjusting the height of the headrest and shoulder belts more convenient. Most significantly, child safety seat 10 does not need to be removed from the vehicle in order to adjust the headrest assembly 40, and a child secured within the child safety seat can remain therein during adjustment. In addition, by providing two release buttons 48, 50, one release button is assured of being easily accessible regardless of whether the child safety seat 10 is installed on the driver side or the passenger side of a vehicle. Furthermore, because shoulder belts 34 extend from seat back 26 immediately below release buttons 48 and 50, a simple indicator is provided for when adjustment is needed. If release buttons 48 and 50 are no longer visible when a child is secured in child safety seat 10, then vertical adjustment of headrest assembly 40 is needed.

Energy Absorbing System

Referring now to FIGS. 7-14, child safety seat 10 includes an energy absorbing system, generally indicated by the numeral 70. Energy absorbing system 70 (also referred to as energy system 70) allows seat body 14 to slide relative to base 12 upon the introduction of force exceeding a predetermined threshold, the force typically caused by a vehicle collision. The movement of seat body 14 is slowed and dampened by a force absorbing mechanism so as to reduce the forces felt by a child restrained within the child safety seat 10.

Energy system 70 includes a front arcuate slot 72 and a back arcuate slot 74 in each sidewall 18, the slots 72, 74 defining an arcuate path of movement for seat body 14. Although only a single sidewall 18 is shown in the drawings, it will be appreciated by those skilled in the art that the opposing sidewalls 18 are substantially identical in structure and function. Slots 72, 74 have a common radius, and are substantially identical in configuration. Front slot 72 is positioned adjacent the front surface 20 of base 12, and back slot 74 is positioned substantially below seat back 26.

A front cross-bar 76 is received in slot 72 in each sidewall 18, and extends therebetween. A back cross-bar 78 is received slot 74 in each sidewall, and extends therebetween. Each cross-bar 76, 78 has an enlarged end to maintain it in the proper position within slots 72, 74. The enlarged end may be provided in the form of a fastener threaded into a bore in the cross-bar The cross-bar may take any desired shape and may be, for example, a cylindrical cross-bar. Each cross-bar passes through or is otherwise secured to the frame (not shown) of seat body 14 so that arcuate movement of cross-bars 76, 78 within slots 72, 74 results in identical arcuate movement of seat body 14. While a particular structural configuration for allowing arcuate movement of seat body 14 relative to base 12 is shown in the drawings and described herein, it should be appreciated that any known system may be employed. For example, seat body may be provided with an outwardly extending arcuate flange that is received in an arcuate recess in sidewall 18 of base 12.

Figure 7:
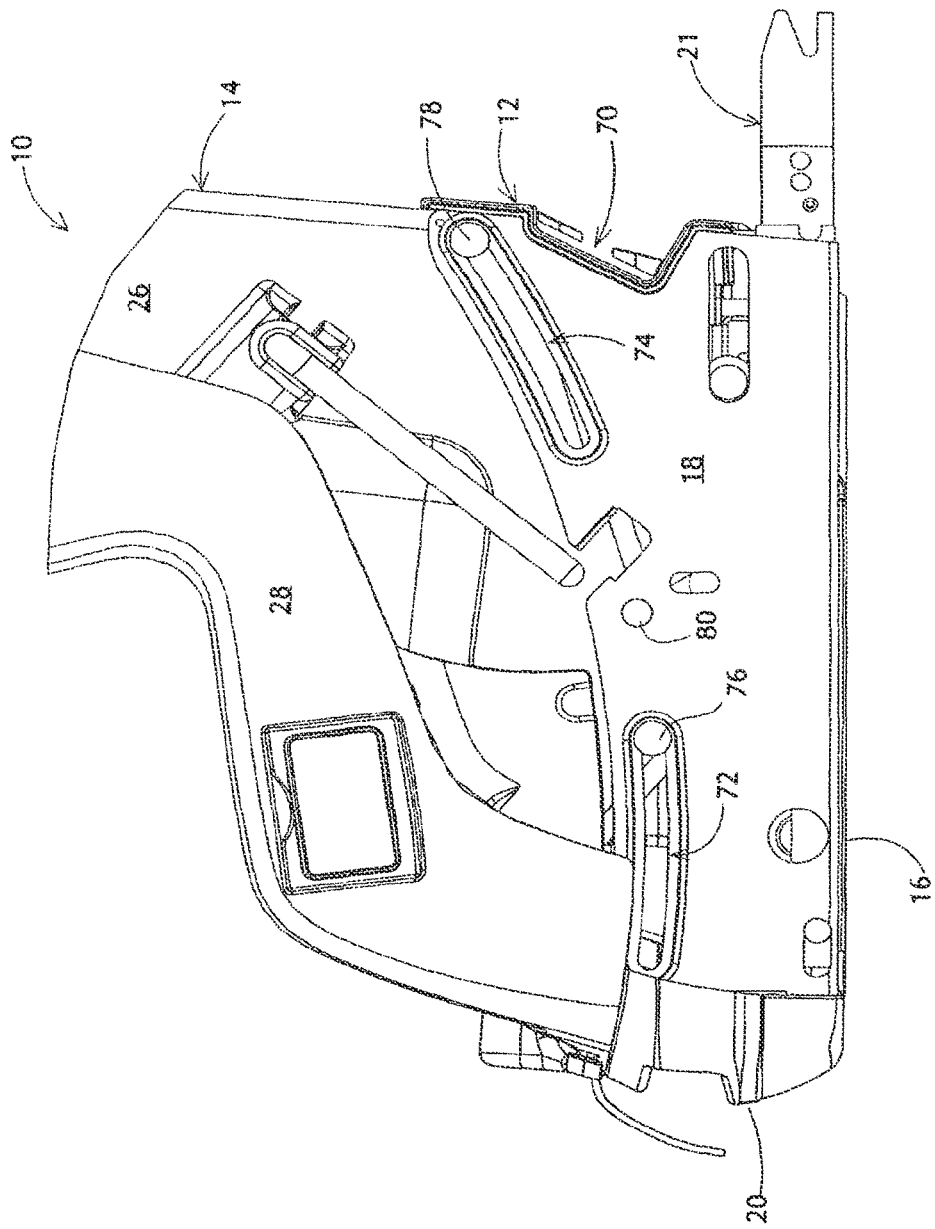
FIG. 7 is a side view of the child safety seat with the exterior base cover removed.
Figure 8:
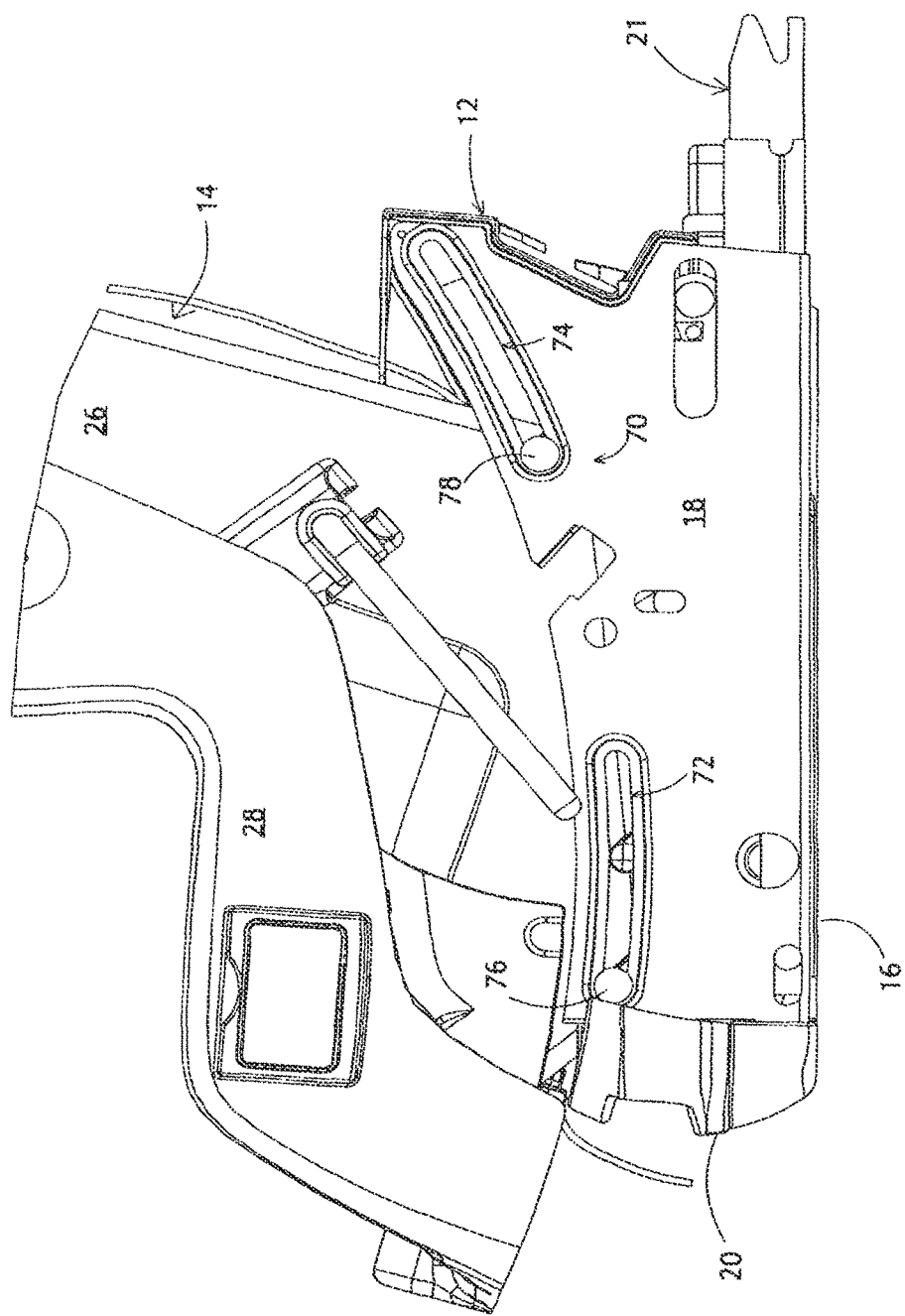
FIG. 8 is a side view of the child safety seat as shown in FIG. 7, with the seat body in a forward, post-collision position.

A shear pin 80 is provided in each sidewall 18 to secure seat body 14 to base 12 and prevent movement along slots 72, 74 (referred to as pre-collision position) unless a force threshold is exceeded. If the requisite force threshold is exceeded, shear pin gives way and seat body 14 is allowed to slide along slots 72, 74. Shear pin 80 extends through sidewall 18 and into seat body 14. Shear pins are well known and are available in a variety of forms, materials and sizes, and it will be appreciated by those skilled in the art that the specifications of the shear pin will determine what force threshold must be exceeded before seat body 14 moves relative to base 12. A shear pin 80 having a large diameter and made of a strong material will have a higher force threshold than a shear pin 80 having a relatively small diameter and made of a weaker material, in one or more embodiments, the shear pin may be made of a thermoplastic material, including, for example, polyethylene. In these or other embodiments, the shear pin may have a diameter of between approximately 0.10 and 1.0 inches. FIG. 7 shows seat body 14 in the pre-collision position where it is secured by shear pin 80 relative to base 12. FIG. 8 depicts seat body 14 in a post-collision position where it has overcome the resistance of shear pin 80 and moved along slots 72, 74 to dissipate forces acting upon child safety seat 10.

At least one dampening member is provided within base 12 and is positioned between base 12 and seat body 14 to absorb forces acting upon child safety seat 10. This dampening member may be a plurality of honey-comb core energy absorption columns 82 (FIGS. 9-13), also referred to as crush columns 82. Crush columns 82 are positioned and configured so that, when seat body 14 slides along slots 72, 74, they are crushed by the force exerted by seat body 14, thereby absorbing and dissipating energy before it can impact a child restrained within child safety seat 10. It is also contemplated that alternative force damping members may be employed to resist movement of seat body 14 along slots 72 and 74. Such force dampening members need only be able to absorb and dissipate energy generated by a collision while allowing some restrained movement of seat body 14 relative to base 12. Suitable alternative force dampening members will be apparent to those skilled in the art.

A support plate 84 is attached to base 12 and supports crush columns 82. One end of crush columns 82 rests against and is supported by support plate 84. An impactor 86 is secured to seat body 14 and is positioned on an opposite longitudinal end of crush columns 82. Thus, movement of seat body 14 causes movement of impactor 86 relative to support plate 84, thereby crushing columns 82 therebetween. Impactor 86 may be secured to back cross-bar 78, which is secured to the frame of seat body 14. In the embodiment shown in FIGS. 9-14, support plate 84 is generally planar adjacent to crush columns 82, whereas impactor 86 has a generally cylindrical shape.

The particular shape of impactor 86 is not critical. However, it is preferred that impactor 86 is not planar along the surface that contacts crush columns 82 so that the resistance provided by crush-columns 82 is progressive in nature. A non-planar impactor, such as the cylindrical impactor 86 shown in FIGS. 9-13, will encounter progressively greater resistance as it crushes crush-columns 82 due to a progressively increasing area of contact between column 82 and impactor 86, as will be appreciated by those skilled in the art. Once the impactor is fully engaged with the crush column, the resistance offered by the column will become constant. The progressive dampening provided by a non-planar impactor improves the ability to effectively dampen forces generated by children of widely varying sizes restrained within the child safety seat 10.

Figure 9:
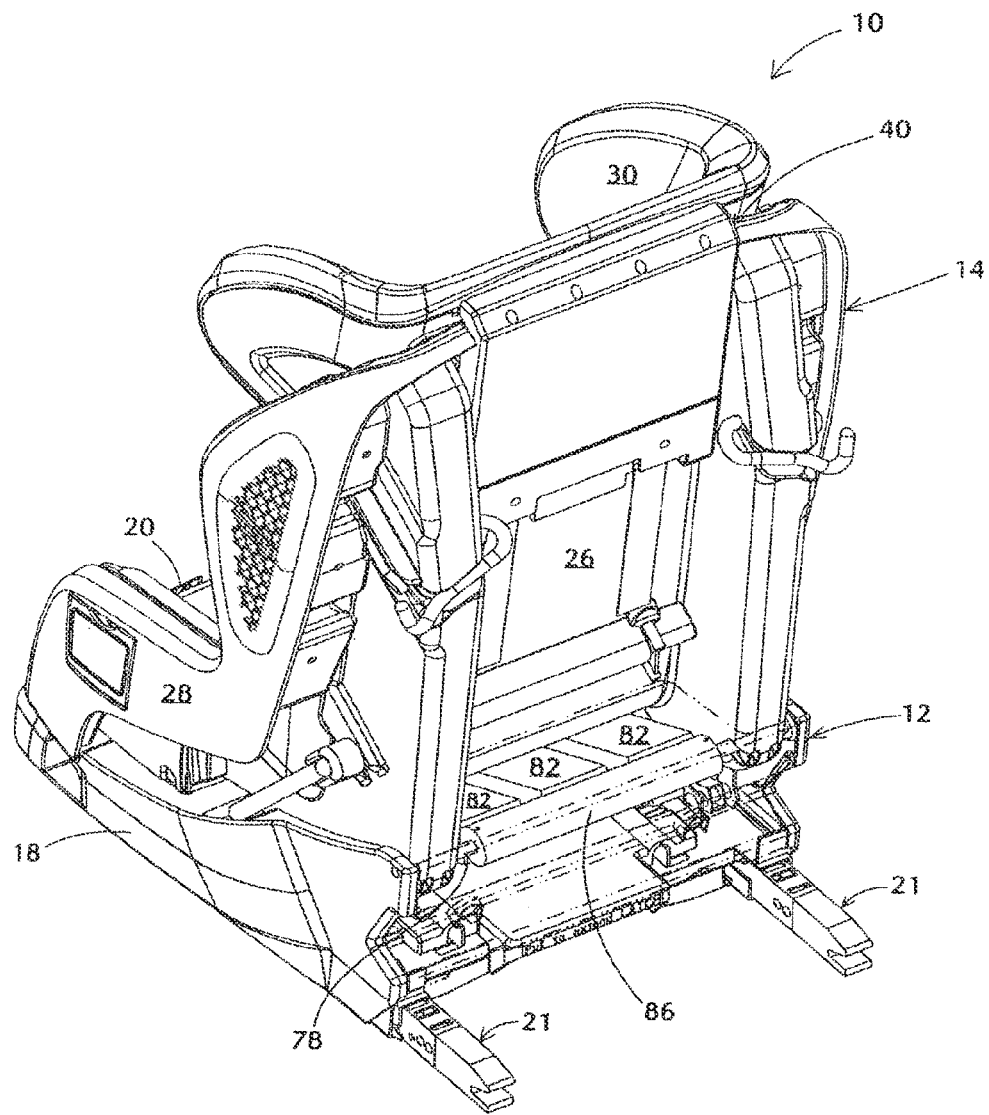
FIG. 9 is a rear perspective view of the child safety seat showing the impactor and energy absorbing columns of the energy absorption system.
Figure 10:
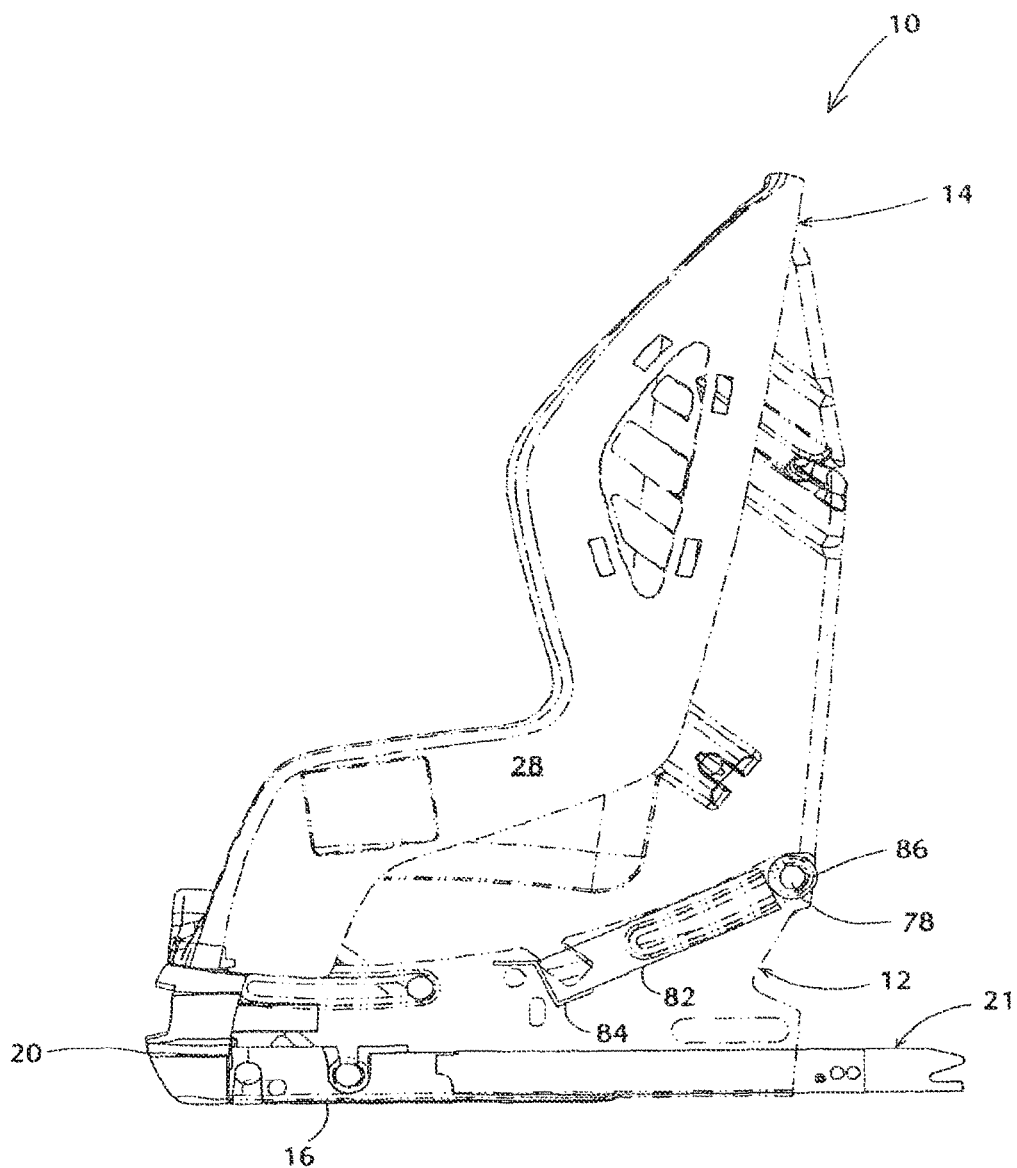
FIG. 10 is a side cut-away view of the child safety seat showing the impact and energy absorbing columns of the energy absorption system.
Figure 11:
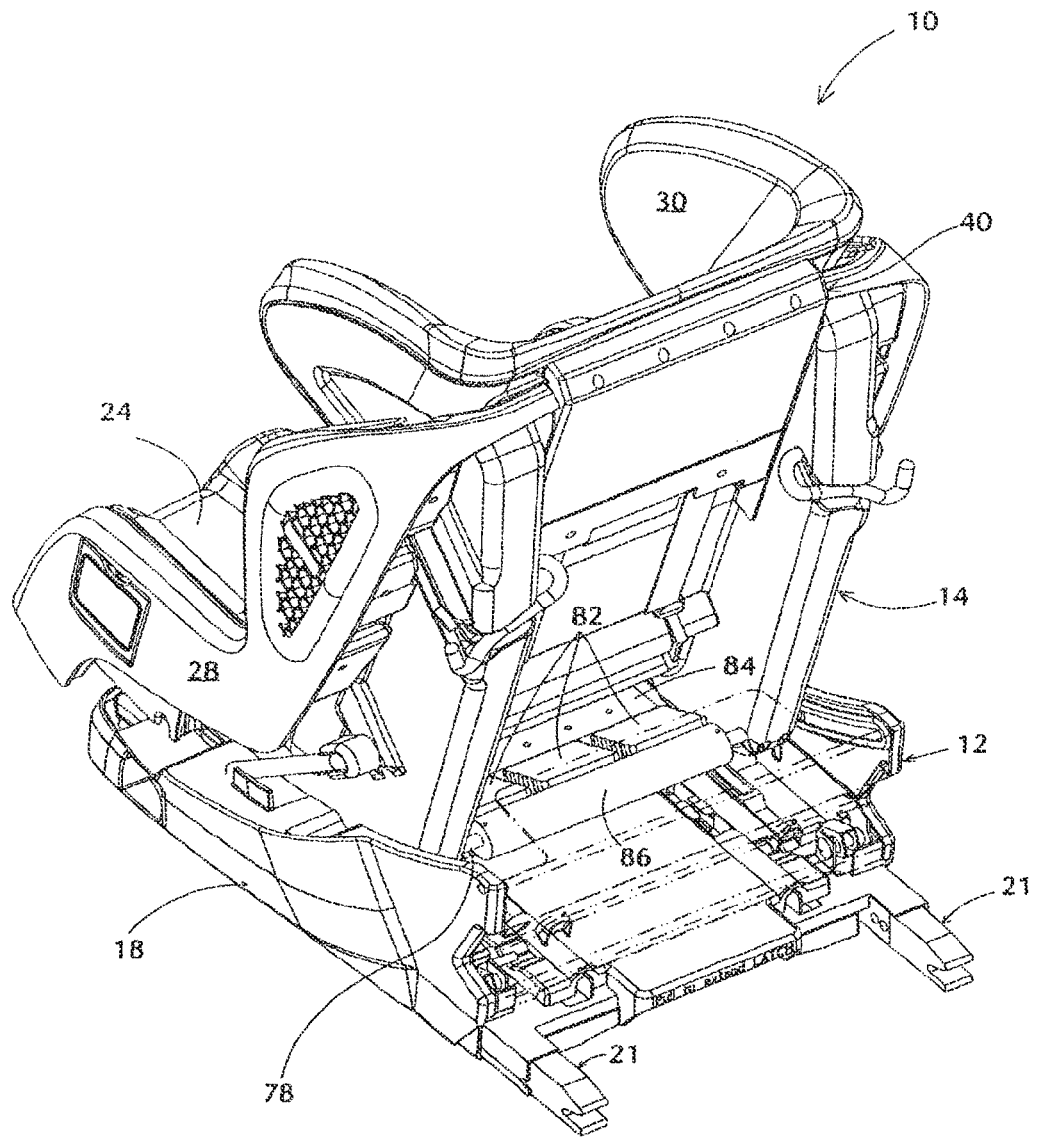
FIG. 11 is a rear perspective view of the child safety seat, as shown in FIG. 9, with the seat body in a forward, post-collision position and the energy absorbing columns in a crushed state.
Figure 12:
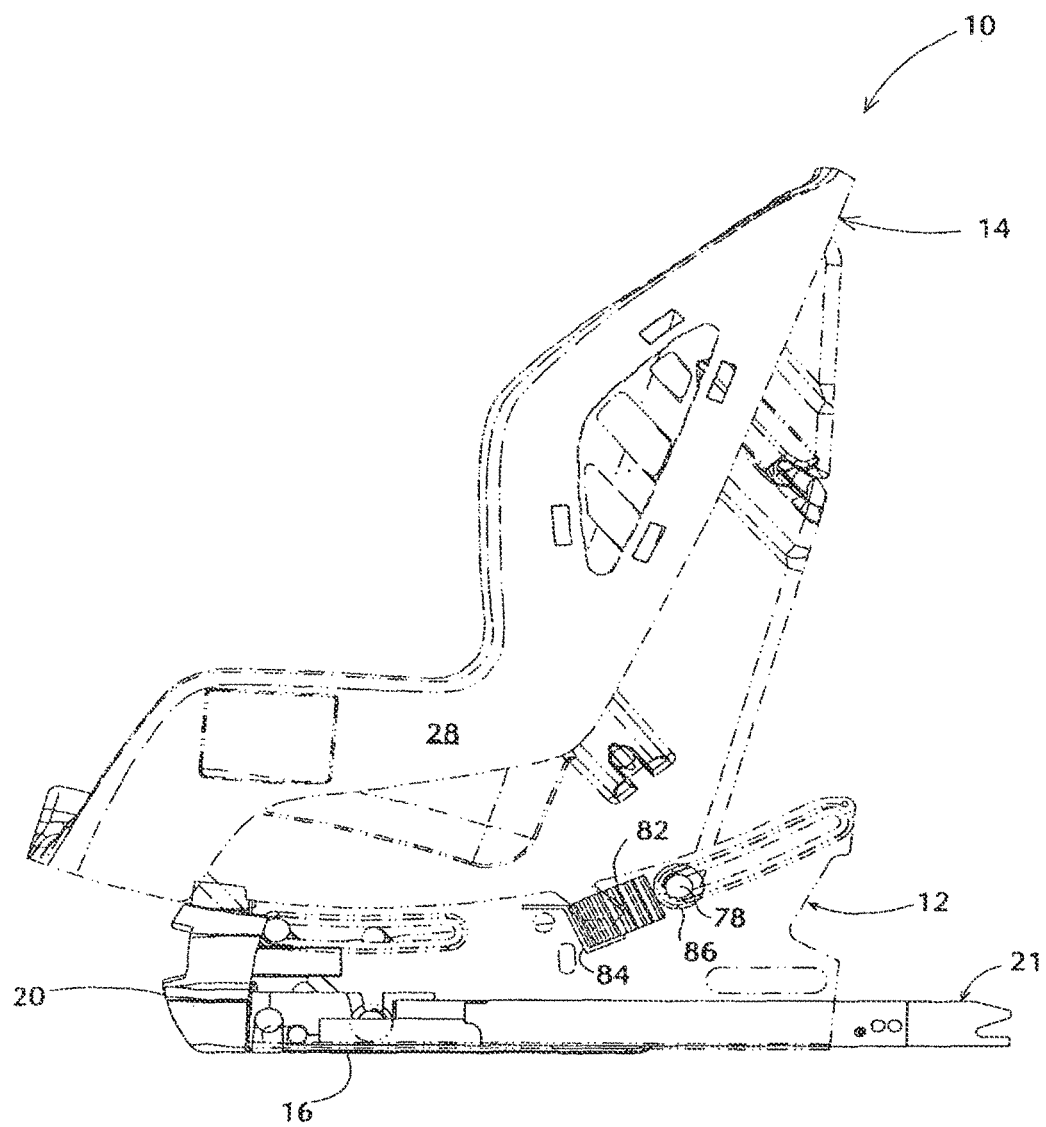
FIG. 12 is a side cut-away view of the child safety seat, as shown in FIG. 10, with the seat body in a forward, post-collision position and the energy absorbing columns in a crushed state.

FIGS. 9 and 10 depict child safety seat 10 in the pre-collision position where seat body 14 is secured to base 12 by shear pin 80, thereby preventing movement relative thereto. In the pre-collision position, crush columns 82 are positioned between support plate 84 and impactor 86 in a fully extended, non-compressed state. Crush columns 82 are in contact at one end with support plate 84, and may be in contact at the other end with impactor 86. It is also contemplated that a small gap may exist between impactor 86 and crush columns 82 in the pre-collision position. FIGS. 11 and 12 show child safety seat 10 in the post-collision position where seat body 14 has moved along slots 72 and 74 relative to base 12. Crush columns 82 have been compressed by impactor 86 during the movement of seat body 14, thereby absorbing the forces of an impact and reducing the forces acting upon a child restrained within the seat.

Figure 13:
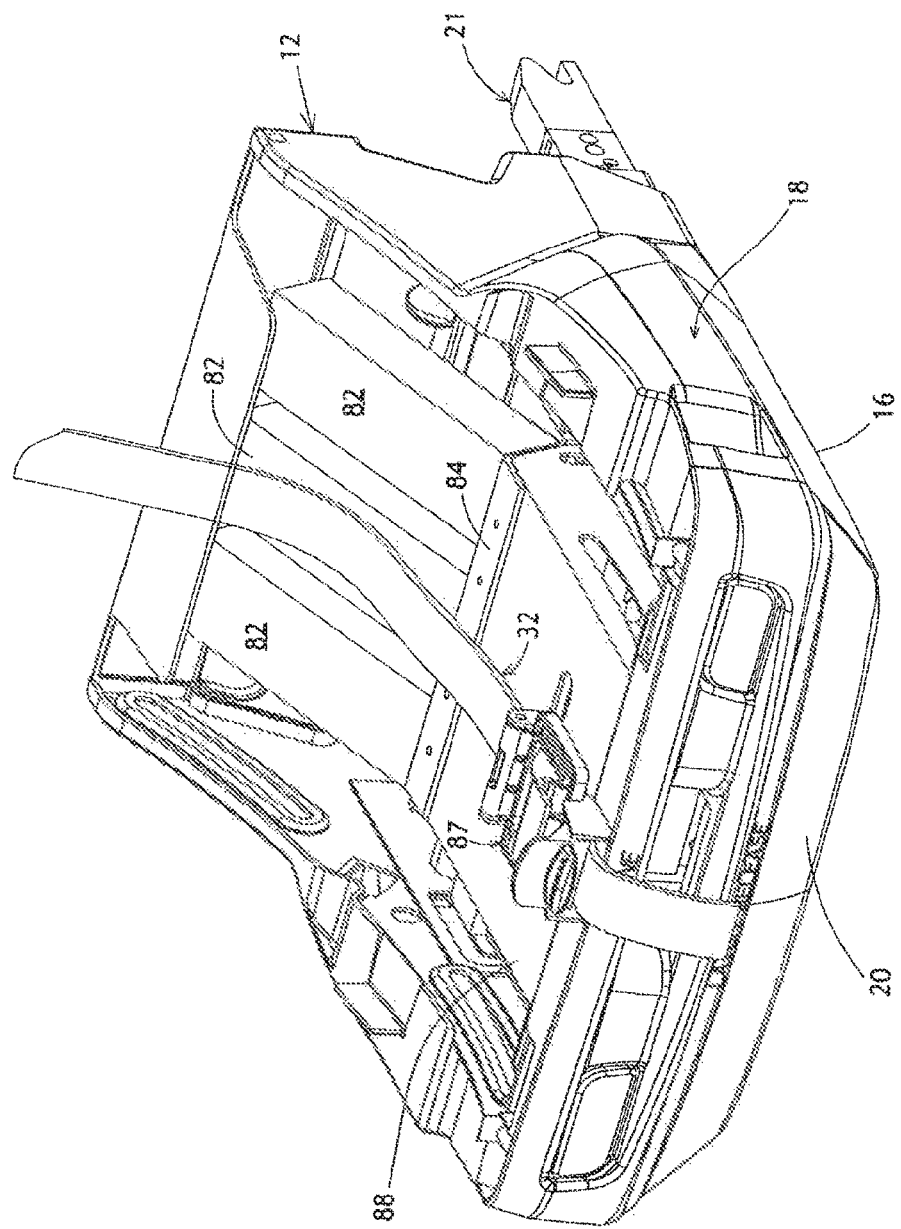
FIG. 13 is a front perspective view of the child safety seat showing the harness anchoring point.

When child safety seat 10 is subjected to the forces of a collision, a child therein tends to be forced forward against the shoulder belts 34 of harness system 32. This forward force against shoulder belts 34 is in a direction opposite to the force dampening movement of seat body 14 along slots 72, 74, thereby reducing the effectiveness of energy system 70. To overcome this opposing force, harness system 32 is anchored to a harness adjustment member 87 that is secured to an anchor plate 88 on base 12, as shown in FIG. 13. Harness adjustment members 87 are well known in the art and may be provided in any known form. Forces acting against shoulder belts 34 in a collision will tend to pull against base 12 and pull seat body 14 forward along tracks 72, 74. Thus, by anchoring harness system 32 to base 12 at anchor plate 88, the force that would otherwise oppose movement of seat body 14 in slots 72, 74 instead generates force in the same direction as the movement of seat body 14, allowing energy system 70 to dissipate it.

Figure 14:
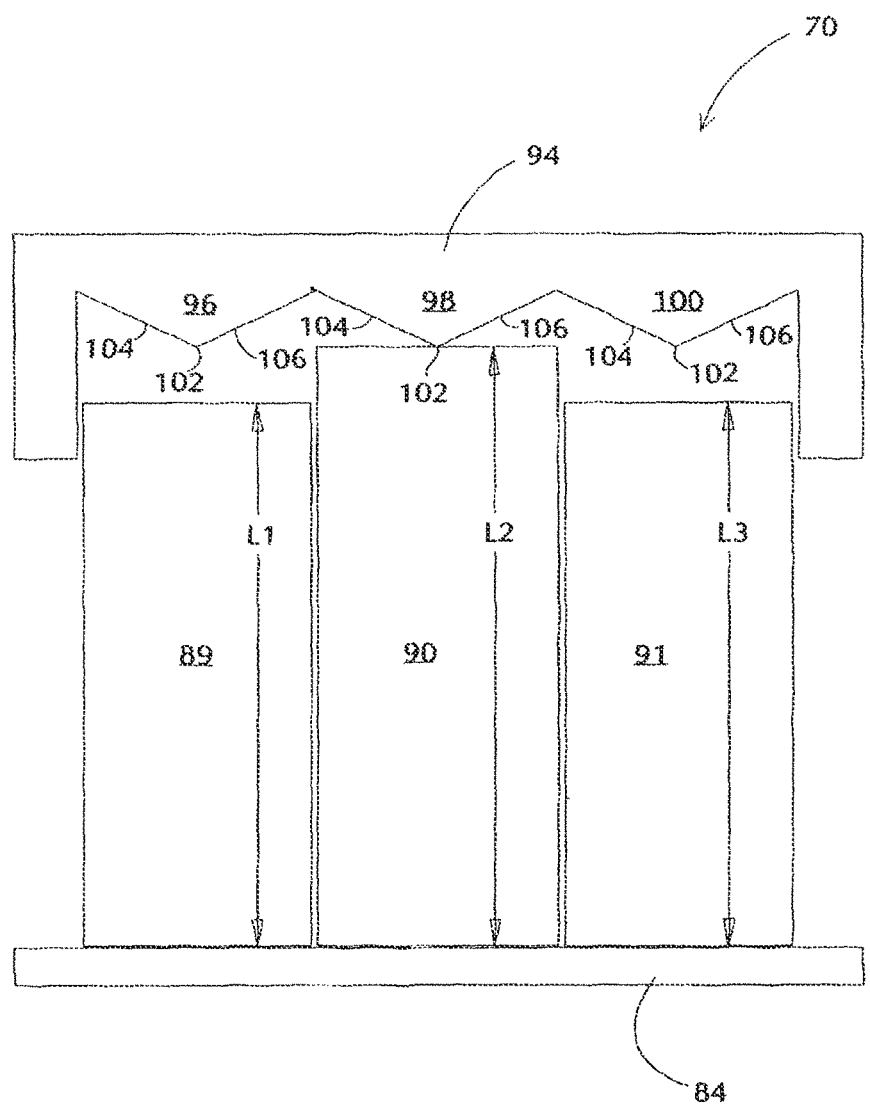
FIG. 14 is a schematic representation of an alternate energy absorbing configuration with energy absorbing columns of varying length.
Figure 15:
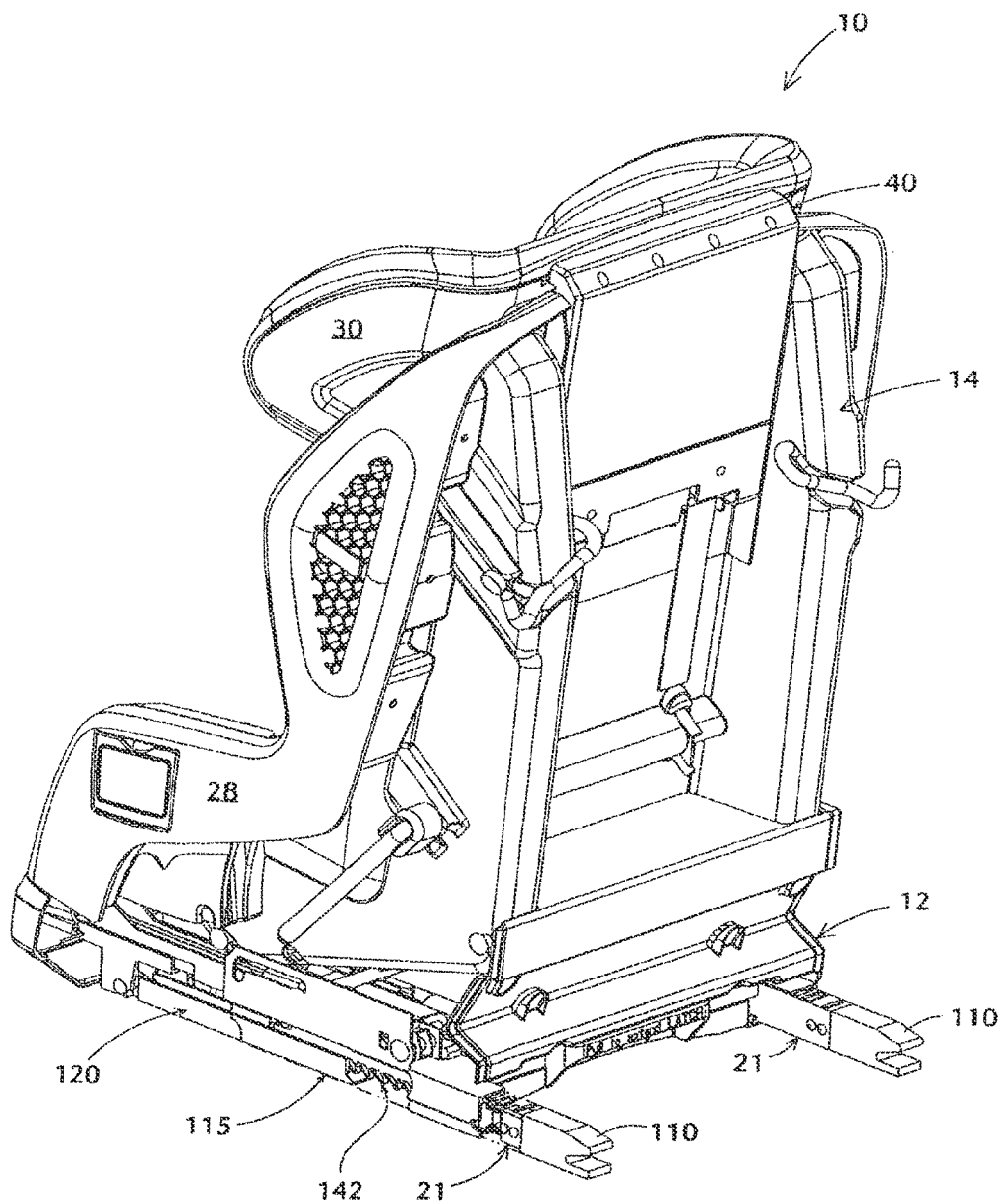
FIG. 15 is a rear perspective view of the child safety seat and the latch members.
Figure 16:
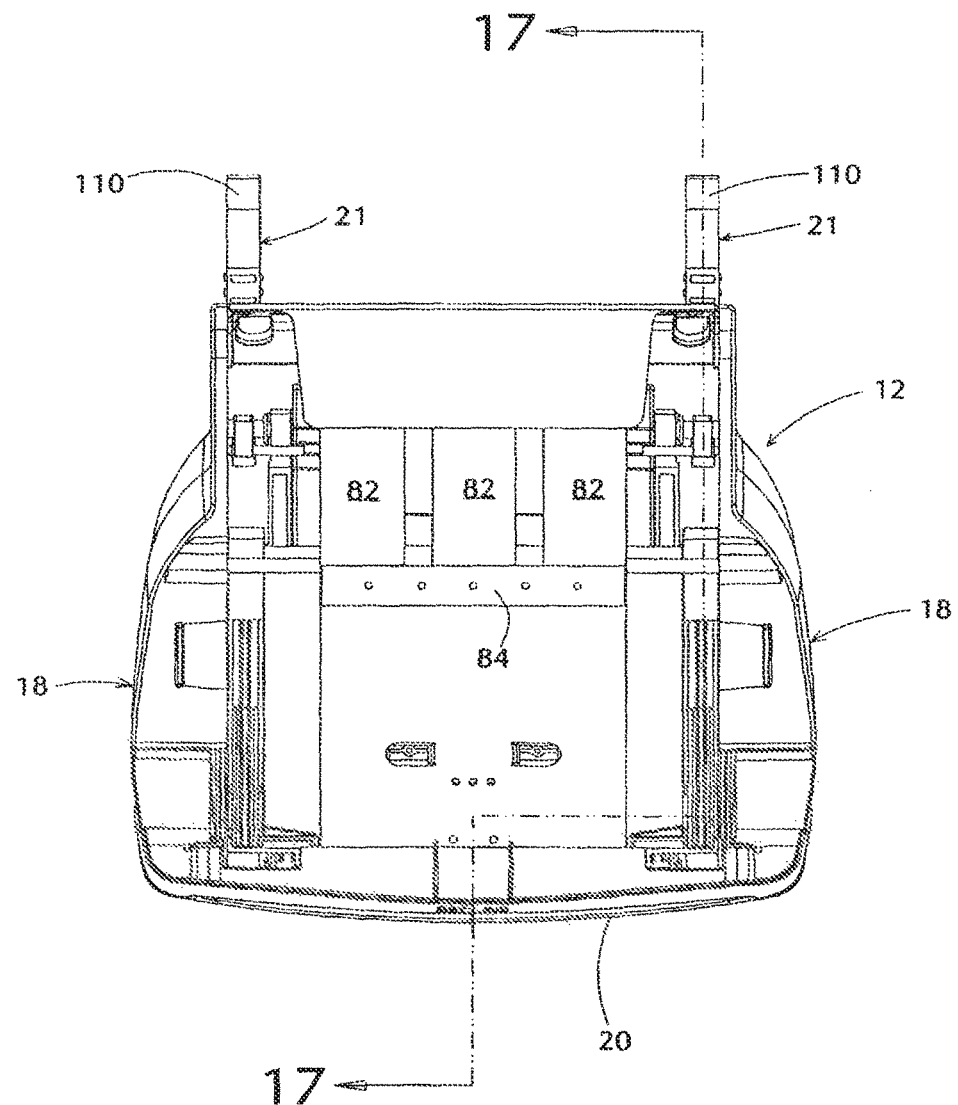
FIG. 16 is a top plan view of the base of the child safety seat.
Figure 17:
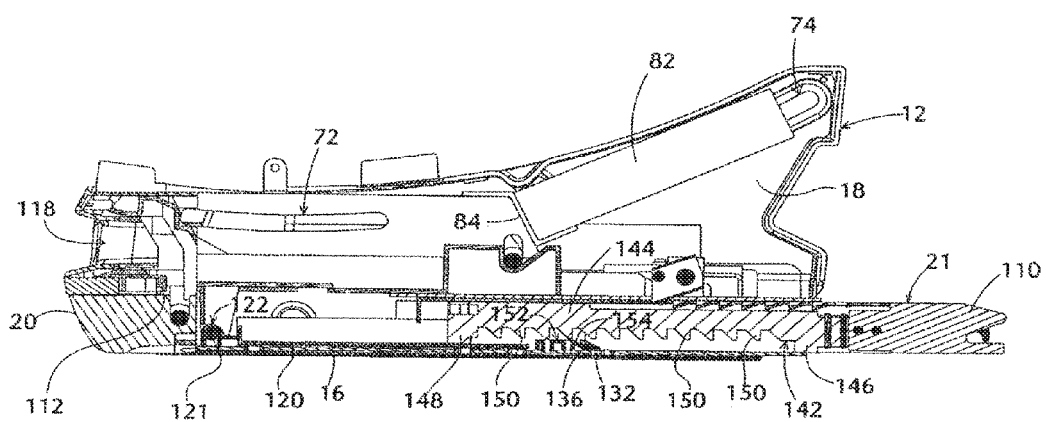
FIG. 17A is a sectional view taken substantially along line 17-17 of FIG. 16 showing the latch release mechanism in an unactuated position.
FIG. 17B is a sectional view similar to FIG. 17A with the latch release mechanism in an actuated position.
Figure 17:
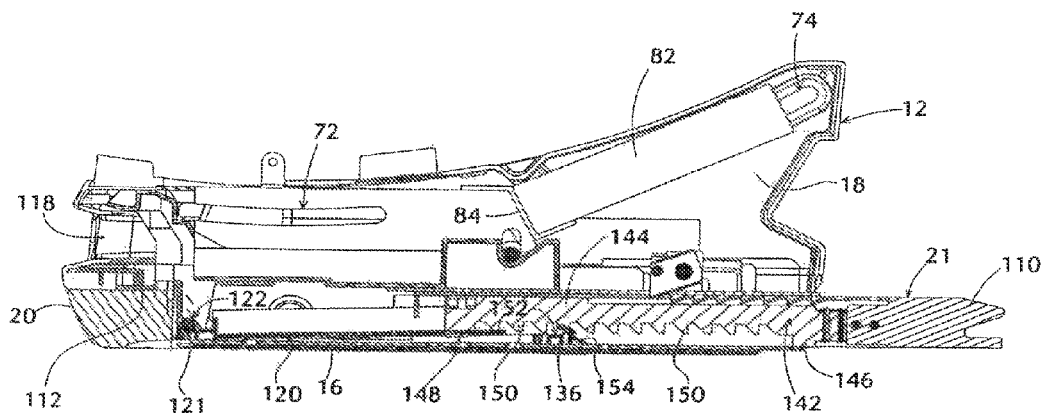
Figure 18:
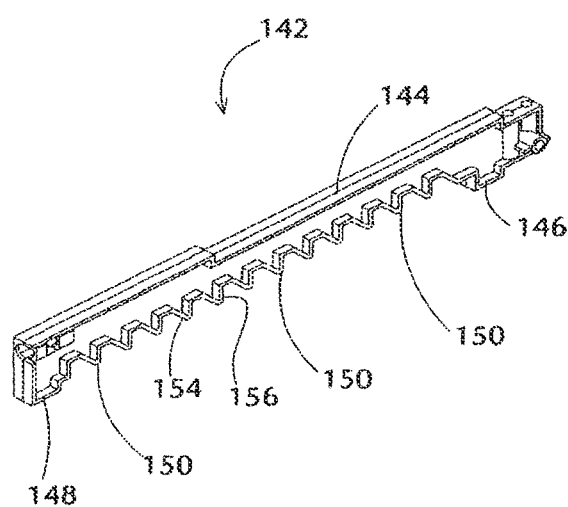
FIG. 18 is perspective view of the latch release member of the latch release mechanism.

To enhance the progressive nature of the dampening provided by energy absorbing system 70, a plurality of crush columns may be provided with varying lengths. Referring to FIG. 14, three crush columns 89, 90, 91 are shown schematically between an alternate impactor 94 and support plate 84. Crush column 90 has a length $L_2$ that is larger than the lengths $L_1$ and $L_3$ of the end crush columns 89 and 91. It should be appreciated that while crush columns 89 and 91 are shown having lengths Le; and $L_3$ that are substantially equal, they may also be provided having lengths $L_1$ and $L_3$ that are different, further enhancing the progressive nature of energy system 70. Impactor 94 is provided with three protrusions 96, 98, and 100, each protrusion having a leading edge 102 and opposing trailing surfaces 104 and 106. Each leading edge 102 is aligned substantially at the center of one of the crush columns 89, 90, 91. The multiple protrusions of impactor 94 provide an alternative non-planar impacting shape to the cylindrical impactor discussed above and shown in FIGS. 7-13. It will be appreciated by those skilled in the art that many such alternative non-planar shapes may be employed to impact and crush the crush columns 82, 89, 90 and 91. It is also contemplated that energy absorbing system 70 may be modified to include more or less crush columns 82 and/or protrusions.

When impactor 94 moves toward support plate 84, the leading edge 102 of protrusion 98 impacts the end surface of crush column 90 and begins to compress the column in a longitudinal direction. The resistance provided by crush column 90 progressively increases as the surface area of contact between protrusion 98 and column 90 increases. Once impactor 94 has moved a distance sufficient to close the gap between crush columns 89 and 91 and the leading edges 102 of protrusions 96 and 100, the end columns 89, 91 will begin to provide resistance against movement of impactor 94 in a similar manner to crush column 90. Only after all three protrusions 96, 98 and 100 are in complete contact with crush columns 89, 90 and 91 along trailing surfaces 104 and 106, will the resistance force provided by the energy absorbing system become constant. If a small child is restrained within child safety seat 10, protrusions 96 and 100 may not fully engage crush columns 89 and 91 before the resistance provided by crush column 90 effectively stops movement of seat body 14 relative to base 12. Conversely, if a larger child is restrained within child safety seat 10, all three protrusions 96, 98 and 100 may fully engage crush columns 89, 90 and 91, and the columns may be compressed a substantial distance before movement of seat body 14 relative to base 12 has been fully stopped.

Latch Release Mechanism

Rigid latch members 21 are provided at the rear of base 12 and secure child safety seat 10 to a vehicle. A single rigid latch member 21 is provided at each lateral side of base 12. Rigid latch members 21 each include an end clamp 110 that engages lower LATCH anchors provided in the vehicle and is biased in a closed, secured position. Such end clamps 110 are well known in the art and are therefore not described in detail herein. Any end clamp 110 known to those skilled in the art may be used.

Rigid latch members 21 are only useful in vehicles equipped with the appropriate LATCH lower anchors to which the latch members 21 are secured. Because the size of vehicle seats, the contours of the vehicle seat backs, and the location of the lower anchors in the vehicle vary, it is preferred that latch members 21 are adjustable in length. Adjustment of latch members 21 allows end clamps 110 to move linearly away from or toward base 12. Such adjustment of the length of latch members 21 may be accomplished by any means known to those skilled in the art. A latch release assembly is provided to allow for the convenient release of end clamps 110 by a lever 112 located adjacent to the front surface 20 of base 12. The latch release assembly is depicted in FIGS. 15-20 and is indicated generally by the numeral 115.

Latch release assembly 115 includes the release lever 112 positioned within a recess 118 (FIG. 1) in front surface 20 of base 12. Release lever 112 is slidably mounted within recess 118, and is biased in an unactuated position, as shown in FIG. 17A. To actuate release lever 112, a user need only reach within recess 118 and pull release lever 112 toward front surface 20, in a forward direction, to release end clamps 110 from the lower anchors of a vehicle. Release lever 112 is connected to an actuating member 120 on each side of base 12 in line with the clamp ends 110. Any connecting means known to those skilled in the art may be used to connect release lever 112 to actuating members 120 and transfer the movement of release lever 112 to the actuating members 120. In one or more embodiments, release lever 112 may include outwardly extending arms 121 that are received in a bore 131 in actuating members 120 to engage and secure release lever 112 thereto at an attachment point 122. Actuating members 120 rest on base bottom 16 and may be restrained from lateral movement by retaining walls or extensions on either side thereof.

Figure 19:
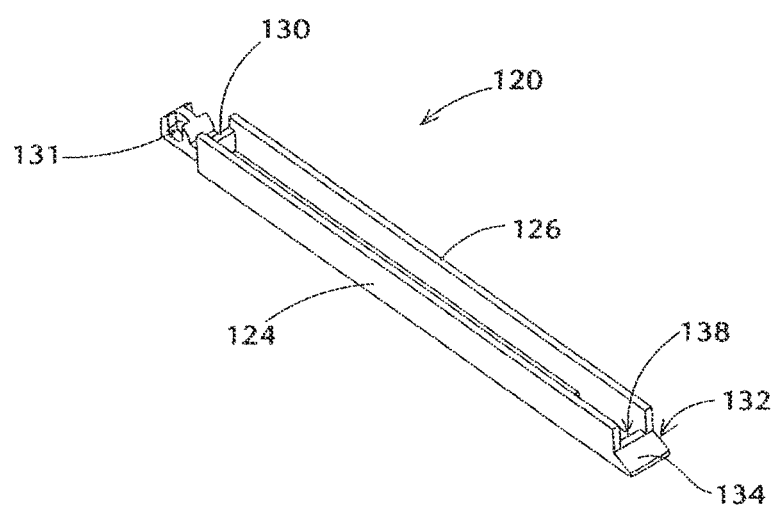
FIG. 19 is a perspective view of the actuator member of the latch release mechanism.
Figure 20:
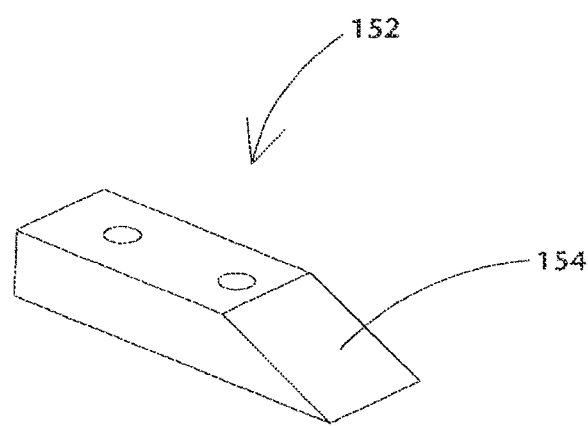
FIG. 20 is a perspective view of the ramp member of the latch release mechanism.

As shown in FIG. 19, actuating members 120 include opposing sidewalls 124 and 126, an end wall 130, and a bore 131 that engages arms 121 of release lever 112 at attachment point 122. A pivoting connection is preferably provided to allow actuating member 120 to pivot relative to release lever 112 and arms 121. Actuating members 120 also include a ramped end 132 opposite end wall 130. Ramped end 132 includes an upper angled surface 134 and a lower angled surface 136 (FIGS. 17A and 17B), and is configured so that upper angled surface 134 faces up and away from end wall 130 and lower angled surface 136 faces down and toward end wall 130. An opening 138 is provided in at least a portion of the bottom of actuating member 120.

A connecting member 142 (FIG. 17A, 17B, 18) is connected to each end clamp 110 and extends therefrom within base 12. Connecting members 142 are generally aligned with actuating members 120 in a longitudinal direction and include a body 144 having a first foot 146 adjacent to end clamp 110 and a second foot 148 positioned between sidewalls 124 and 126 of actuating member 120. First foot 146 and second foot 148 rest on base bottom 16. Connecting member 142 also includes a plurality of longitudinally spaced teeth 150 extending downward from body 144. Teeth 150 have an angled surface 154 and a generally vertical surface 156 (FIG. 18) and extend downwardly from body 144 a distance less than the length of first and second feet 146, 148, so as to leave a gap between the bottom edge of teeth 150 and base bottom 16. Second foot 148 is positioned between sidewalls 124 and 126 of actuating member 120 and extends through opening 138. The gap between teeth 150 and base bottom 16 is large enough to allow connecting member 142 to slide relative to actuating member 120 without contacting ramped end 132. Connecting member 142 is movable so as to allow the position of end clamp 110 to be adjusted relative to base 12. Thus, if end clamp 110 is moved away from base 12, connecting member 142 moves an identical distance until prevented from further movement by second foot 148 contacting ramped end 132 of actuating member 120. A similar stop may be provided in the opposite direction, as will be understood by those skilled in the art. For example, a stop may extend between sidewalls 124 and 126 to prevent second foot 148 from moving farther toward front surface 20.

A ramp 152 (FIG. 20) is secured to base bottom 16 between sidewalls 124, 126 of each actuating member 120 proximate ramped end 132. Ramp 152 has an angled surface 154 that is positioned facing lower angled surface 136. Thus, when release lever 112 is actuated (FIG. 17B), the movement is transferred to actuating member 120, which moves longitudinally toward front surface 20 of base 12. The movement of actuating member 120 causes lower angled surface 136 to engage and travel up angled surface 154. As actuating member 120 moves up angled surface 154, it pivots about an axis through attachment point 122 and engages one of the teeth 150 extending from connecting member 142. The longitudinal movement of actuating member 120 is thus transferred to connecting member 142 and end clamp 110, thereby causing end clamp 110 to open and release the lower anchors within the vehicle.

As will be appreciated by those skilled in the art, the latch release assembly as described herein allows for adjustment of the position of end clamp 110 and convenient positioning of the release lever at the front of child safety seat 10. More specifically, the presence of a plurality of teeth 150 along connecting member 142 ensures that the end clamp 110 remains in engagement with release lever 112 regardless of its position relative to base 12.

The invention claimed is:

1. A child safety seat comprising:
   a base;
   a seat body slidably secured to said base and movable for a travel distance defined by a pre-collision position and a post-collision position;
   a dampening member positioned between said base and said seat body; and
   a non-planar impactor secured to said seat body and positioned to engage said dampening member, said non-planar impactor and said dampening member providing a progressively increasing dampening force against movement of said seat body within first portion of the travel distance, and providing a constant dampening force against movement of said seat body within a second portion of the travel distance.

2. The child safety seat of claim 1, said base including opposing sidewalls each having at least one slot therethrough.

3. The child safety seat of claim 2, further comprising a cross-bar secured to said seat body and extending between and received in said slots in said sidewalls.

4. The child safety seat of claim 3, wherein said non-planar impactor is secured to said cross-bar.

5. The child safety seat of claim 1, said base including opposing sidewalls each having a front arcuate slot and a rear arcuate slot, wherein said seat body includes a front cross-bar extending between and received in said front arcuate slots in said sidewalls and a rear cross-bar extending between and received in said rear arcuate slots, said non-planar impactor being secured to said rear cross-bar.

6. The child safety seat of claim 1, wherein said non-planar impactor is cylindrical in shape.

7. The child safety seat of claim 1, wherein said dampening member is a honey-comb core column.

8. The child safety seat of claim 1, wherein said dampening member includes a plurality of honey-comb core columns.

9. The child safety seat of claim 8, wherein said plurality of honey-comb core columns are of varying lengths, one end of each column positioned against a support plate secured to said base.

10. The child safety seat of claim 9, said impactor having a plurality of protrusions, each said protrusion being aligned with one of said honey-comb core columns.

11. The child safety seat of claim 10, wherein each of said protrusions includes a leading edge and trailing surfaces extending in opposing directions from said leading edge.

12. The child safety seat of claim 1, wherein said seat body is restrained from sliding relative to said base when in the pre-collision position by a shear pin passing through said base and said seat body.

13. The child safety seat of claim 1, further comprising a release lever accessible from a front of the seat body; a pair of laterally spaced clamp members extending rearwardly from said seat body and biased in a position to engage an anchor in the vehicle; and a release assembly connecting said release lever to said clamp members, said release assembly including a pair of connecting members connected to said clamp members and having a plurality of longitudinally spaced teeth, and a pair of actuating members that engage one of said teeth of said connecting members to cause said clamp members to open.

* * * * *